Figure 4:
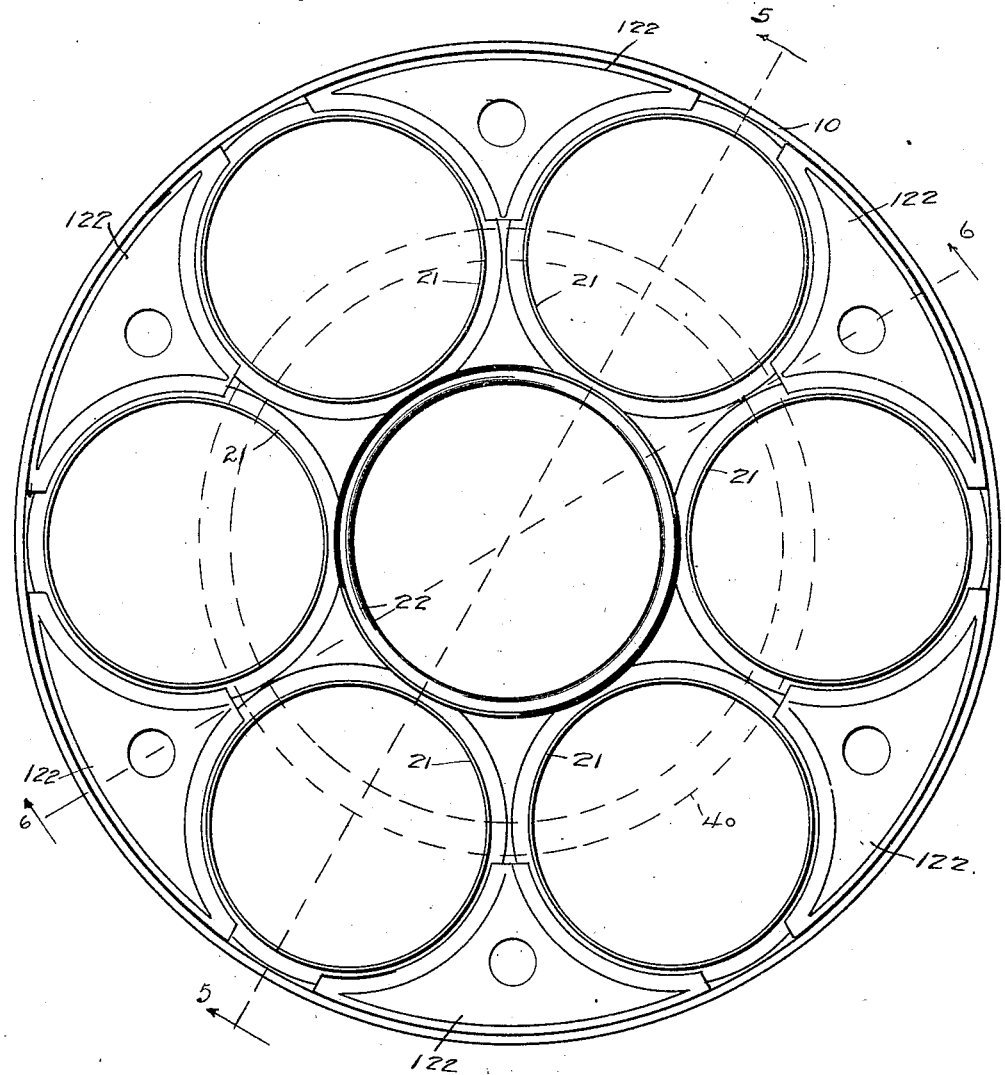

H. B. COATS.
PROCESS OF MAKING VEHICLE WHEELS.
APPLICATION FILED APR. 14, 1917.
1,257,318.
Patented Feb. 26, 1918.
3 SHEETS—SHEET 1.
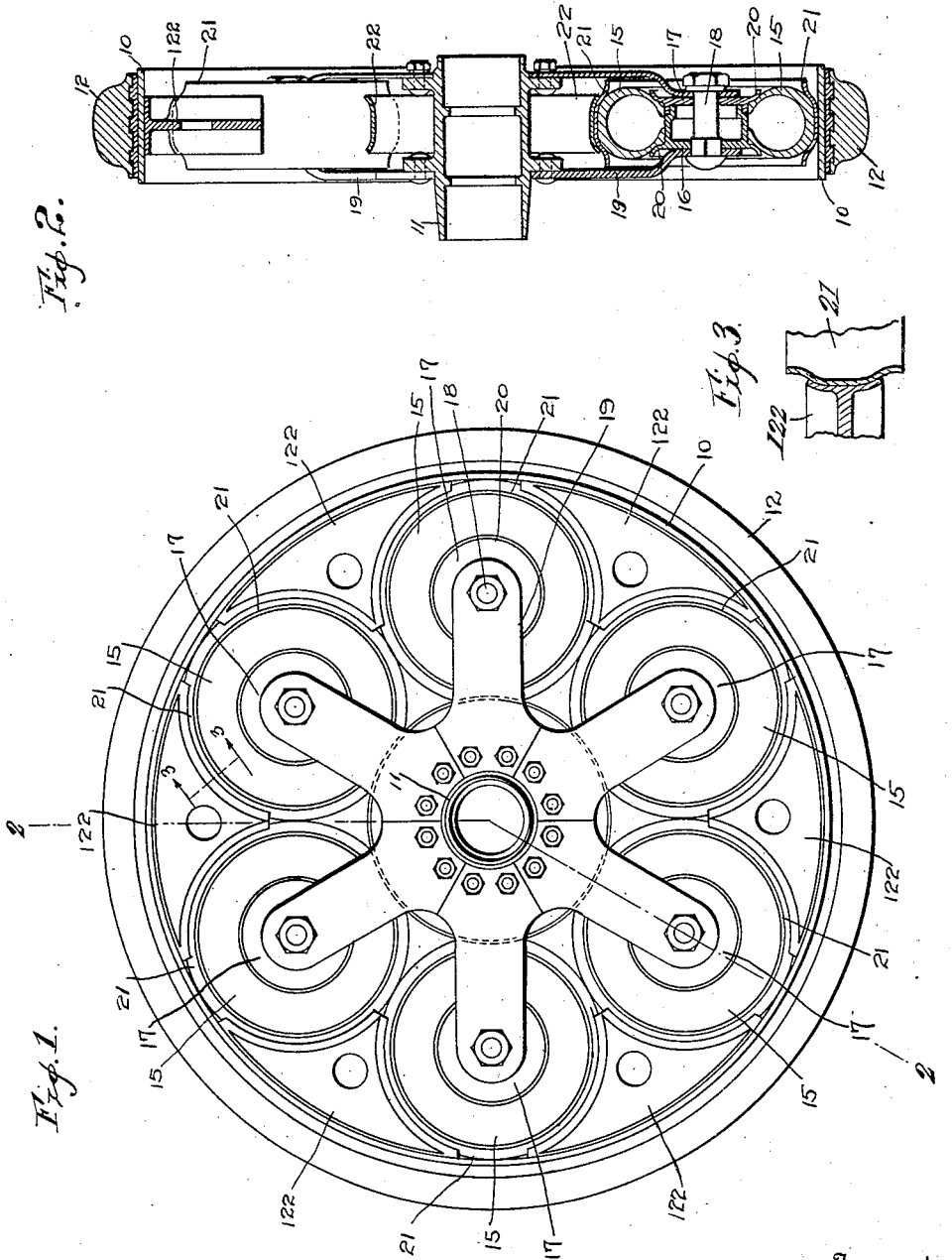
Inventor
HENRY B. COATS
By Lockwood & Lockwood
Attorneys

H. B. COATS.
PROCESS OF MAKING VEHICLE WHEELS.
APPLICATION FILED APR. 14, 1917.

1,257,318.

Patented Feb. 26, 1918.
3 SHEETS—SHEET 2.

Inventor
HENRY B. COATS

By Lockwood & Lockwood
Attorneys.

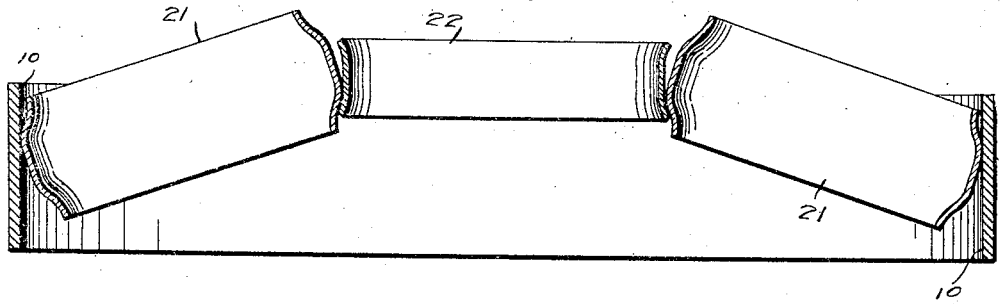
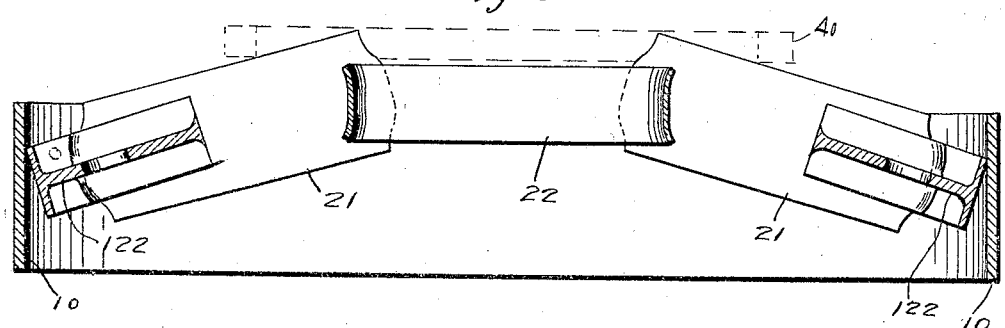
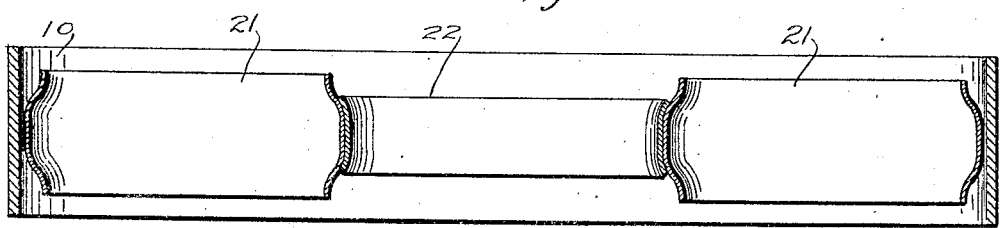
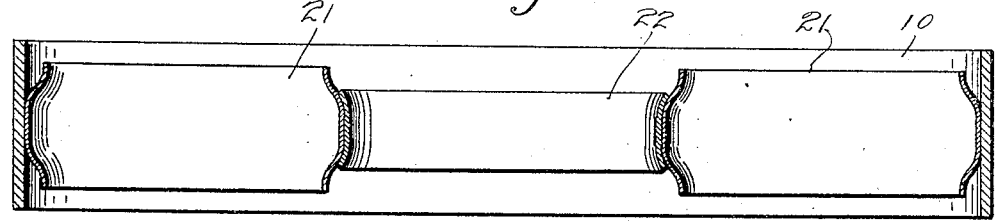

UNITED STATES PATENT OFFICE.

HENRY B. COATS, OF CRAWFORDSVILLE, INDIANA.

PROCESS OF MAKING VEHICLE-WHEELS.

1,257,318.   Specification of Letters Patent.   Patented Feb. 26, 1918.

Application filed April 14, 1917. Serial No. 162,217.

*To all whom it may concern:*

Be it known that I, HENRY B. COATS, a citizen of the United States, and a resident of Crawfordsville, county of Montgomery, and State of Indiana, have invented a certain new and useful Process of Making Vehicle-Wheels; and I do hereby declare that the following is a full, clear, and exact description thereof, reference being had to the accompanying drawings, in which like letters refer to like parts.

The object of this invention is to improve the construction and operation of vehicle wheels, particularly those adapted for automobiles and especially for motor trucks, wherein there is a series of annular pneumatic cushions mounted between the tire and hub portion of the wheel for yieldingly supporting said two wheel members in relation to each other. And more particularly the object of this invention is to make, in a practical manner and form, a wheel structure for the mounting of a series of such cushions, as is herein shown.

This invention relates to the process of making such vehicle wheels and the chief feature of such invention or process is the nesting of the parts, as herein set forth, composing the steel structure for the mounting of the series of cushions to form the completed wheel. A further feature of said invention or process is the nesting of the parts of said structure, particularly the tire rim, a centrally located member and an intermediate series of rims for said cushions, said cushion rims being held by and between the tire rim and said central member under compression. This assembling of said parts so they will be under compression and tension stresses makes said structure a unitary one and yielding instead of rigid and tends to hold said parts in place.

The full nature of the invention will be understood from the accompanying drawings and the following description and claims:

In the drawings, Figure 1 is a side elevation of the wheel to be made. Fig. 2 is a section on the line 2—2 of Fig. 1. Fig. 3 is a section through a part of the wheel on the line 3—3 of Fig. 1. Fig. 4 is a plan view of the parts of the cushion holding structure in the first step of assembling them. Fig. 5 is a section on the line 5—5 of Fig. 4. Fig. 6 is a section on the line 6—6 of Fig. 4. Fig. 7 is the same as Fig. 5 after the intermediate parts have been forced down into place in the tire rim and before the latter is compressed. Fig. 8 is the same as Fig. 7 after the tire rim is compressed.

The vehicle wheel, which is made by this new process and which is shown in Figs. 1 and 2, will first be described. There is an annular tire rim 10 and a centrally located hub 11, said hub and the parts secured thereto floating within the wheel rim so that said rim or hub may yield radially with reference to the other under the influence of the load. The rim or felly band 10 is of standard type and has its periphery transversely flat and the standard type of tire 12 is secured thereon in a manner common in the art.

Between the hub and rim there is a series of annular pneumatic cushions 15 mounted on and surrounding a cylindrical supporting member formed of the parts 16 and 17 which are held together by a bolt 18 through the radial arms 19 which extend from and are secured to the hub. Said supporting member has peripheral and outwardly-turned flanges 20 which together with the periphery of said member constitute an inner rim or holding means for the cushions. There is an outer rim 21 which engages the tire rim 10 between the substantially triangular-shaped reinforcing members 122.

There is a centrally located annular inner member 22 surrounding the hub and spaced therefrom and with its periphery engaging the inner portions of the entire set of external cushion rims 21. The outer periphery of the inner or central member 22 is transversely cupped so as to partially embrace transversely the inner portions of all of the external outer cushion rims 21, as shown in Figs. 1 and 2. The reinforcing members 122 likewise are cupped on their surfaces adjacent the outer rims 21 of the cushions so as to embrace the same, as shown in Figs. 1 and 3.

In the process of making said vehicle wheels, the tire rims 10, outer clencher rims 21 of the cushions, centrally located member 22 and the reinforcing members 122 are separately made conveniently of stamped or rolled steel.

In assembling said last-mentioned parts, the reinforcing members 122 are first located within the tire rim and then the series of cushion rims 21 are placed, one cushion rim between each pair of reinforcing members and so that said cushion rims will be embraced by the cupped adjacent surfaces of the reinforcing members. The cushion rims are all of such diameter that they will engage or abut against each other in series and will also extend very close to the tire rim. Then the inner portions of the series of the cushion rims are lifted up to some extent so that the central annular member 22 may be placed between them, as shown in Fig. 4, and with its cupped surface embracing the adjacent portions of the cushion rims. The central member 21 is so large in diameter that it cannot be placed in position within said series of cushion rims without elevating their inner portions somewhat, as stated above, and, therefore, when the central member 22 is assembled by hand, the structure will be pyramidal, as shown in Figs. 5 and 6.

The next step in the process is to force the central portion of said assembled parts down from the pyramidal form, as shown in Figs. 5 and 6, to a substantially horizontal position, as shown in Figs. 7 and 8. This is usually done by placing an annular ring-like member 40 concentrically of the structure and forcing it down in any suitable manner so that all of the cushion rims and the central members 21 will be forced down equally and simultaneously, to the horizontal position. When in this horizontal position, as shown in Figs. 7 and 8, the reinforcing members 122 will engage the tire rim 10 and will also engage the cushion rims, but the cushion rims will not engage the tire rim, for there must be a sufficient clearance between the tire rim 10 and the cushion rims to allow for the parts to be assembled in a pyramidal form and forced down into horizontal position, as above explained.

The next step in the process is the shrinking or compressing of the tire rim 10 so as to reduce its diameter, say three-eighths of an inch or the like, whatever the necessary clearance must be, as above explained, and that compression or contraction of the tire rim puts all of said members under great tension. The tire rim then will forcibly engage the outer portions of all of the cushion rims 21 and said cushion rims will be under considerable compression by and between the outer tire rim 10 and the centrally located member 22, and the reinforcing members 122 coöperate with the tire rim in the compression of the cushion rims. This compression or tension of all of said members secures them tightly together in one unitary structure and also renders such structure yielding to some extent instead of rigid. Furthermore, such compression of said members together with the cupped shape form of their engaging surfaces hold the parts in permanent position and against any lateral displacement.

The shrinking or compression of the tire rim is accomplished by any suitable apparatus which is already common in the art, but it is necessary that said tire rim and said central member 22 during the compression be maintained absolutely concentric in order to preserve the symmetry and balance of the wheel.

The next step is to secure said parts of the metal portion of the wheel together in any suitable manner such as spot welding or riveting. It is particularly important at least to have the reinforcing members 122 secured effectively to the tire rim 10.

Finally, the cushions and other parts of the wheel are assembled and thus the wheel completed for use.

The invention claimed is:

1. The process of making a vehicle wheel, which includes the separate formation of a tire rim, a series of annular cushion rims, and a central member, the nesting of said cushion rims in a circular series within the tire rim and the central member within the circular series of rims, and the treatment of said members in such manner as to cause the tire rim to compress the nested rims together.

2. The process of making a vehicle wheel, which process includes first the separate formation of a tire rim, a member adapted to be centrally located therein, and a series of annular cushion rims adapted to be located between and interfitted with the tire rim and central member, then nesting said parts in pyramidal form, and finally forcing said parts within the tire rim into the plane of the tire rim.

3. The process of making a vehicle wheel, which process includes first the separate formation of a tire rim, a member adapted to be centrally located therein, and a series of annular cushion rims adapted to be located between and interfitted with the tire rim and central member and with each other in succession, then nesting said parts in pyramidal form, and finally forcing said parts within the tire rim into the plane of the tire rim.

4. The process of making a vehicle wheel which process includes first the separate formation of a tire rim, a member adapted to be centrally located therein, and a series of annular cushion rims adapted to be located between and interfitted with the tire rim and central member, said parts having means with cupped surfaces for partially embracing the parts which they are adapted to engage, then nesting said parts in pyramidal form, and finally forcing said parts within the tire rim into the plane of the tire rim.

5. The process of making a vehicle wheel, which process includes first the separate formation of a tire rim, a member adapted to be centrally located therein, and a series of annular cushion rims adapted to be located between and interfitted with the tire rim and central member, then nesting said parts in pyramidal form, then forcing said parts within the tire rim into the plane of the tire rim, and finally circumferentially compressing the tire rim to bind the series of cushion rims between the tire rim and the centrally located member.

6. The process of making a vehicle wheel, which includes the separate formation of a tire rim, a series of annular cushion rims, and a central member, the nesting of said cushion rims in a circular series within the tire rim and the central member within the circular series of cushion rims, and the circumferential compression, beyond the upset point, of the tire rim about the nested members to hold them in place under compression.

7. The process of making a vehicle wheel, which process includes first the separate formation of a tire rim, a member adapted to be centrally located therein, and a series of annular cushion rims adapted to be located between and interfitted with the tire rim and central member, then nesting said parts in pyramidal form, then forcing said parts within the tire rim into the plane of the tire rim and finally compressing the tire rim so as to put the tire rim under tension and the inclosed parts under compression.

8. The process of making a vehicle wheel, which process includes first the separate formation of a tire rim, a member adapted to be centrally located therein, and a series of annular cushion rims adapted to be located between and interfitted with the tire rim and central member, said parts having means with cupped surfaces for partially embracing the parts which they are adapted to engage, then nesting said parts in pyramidal form, then forcing said parts within the tire rim into the plane of the tire rim, and finally compressing the series of cushion rims between the tire rim and the centrally located member.

9. The process of making a vehicle wheel, which process includes making a tire rim, a member adapted to be centrally located therein, a series of annular cushion rims adapted to be located between and interfitted with the tire rim and central member, and reinforcing means adapted to be secured to the tire rim and located between adjacent cushion rims, then nesting said parts in pyramidal form, and finally forcing said parts within the tire rim into the plane of the tire rim.

10. The process of making a vehicle wheel, which process includes making a tire rim, a member adapted to be centrally located therein, a series of annular cushion rims adapted to be located between and interfitted with the tire rim and central member, and reinforcing means adapted to be secured to the tire rim and located between adjacent cushion rims, then nesting said parts in pyramidal form, then forcing said parts within the tire rim into the plane of the tire rim, and finally compressing the series of cushion rims between the tire rim and the centrally located member.

11. The process of making a vehicle wheel, which process includes making a tire rim, a member adapted to be centrally located therein, a series of annular cushion rims adapted to be located between and interfitted with the tire rim and central member, and reinforcing means adapted to be secured to the tire rim located between adjacent cushion rims, said centrally located member, rims and reinforcing means having their adjacent surfaces cupped to interfit with each other, then nesting said parts in pyramidal form, then forcing said parts within the tire rim into the plane of the tire rim, and finally compressing the series of cushion rims between the tire rim and the centrally located member.

12. The process of making a vehicle wheel, which process includes making a tire rim, a member adapted to be centrally located therein, a series of annular cushion rims adapted to be located between and interfitted with the tire rim and central member and reinforcing means adapted to be secured to the tire rim located between adjacent cushion rims, then nesting said parts in pyramidal form, then forcing said parts within the tire rim into the plane of the tire rim, and finally compressing the tire rim so as to put all of the internal parts under compression.

In witness whereof, I have hereunto affixed my signature.

HENRY B. COATS.